Sept. 23, 1947.   C. S. McCANN   2,427,733
OIL FILTER
Filed Nov. 21, 1945   3 Sheets-Sheet 1

INVENTOR.
Charles S. McCann.
BY
Hauseos Dickey Pierce.
ATTORNEYS.

Sept. 23, 1947. C. S. McCANN 2,427,733
OIL FILTER
Filed Nov. 21, 1945 3 Sheets-Sheet 2
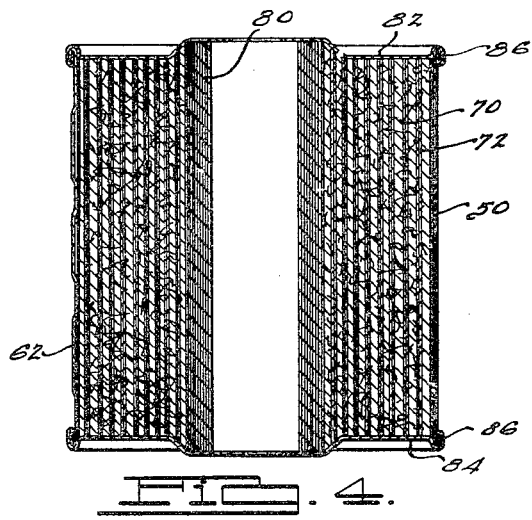
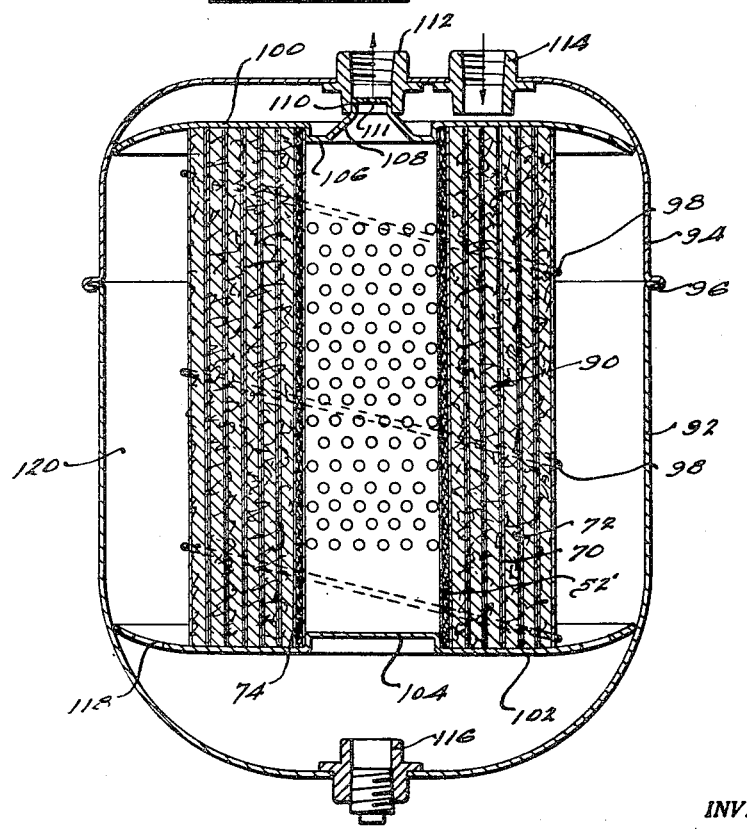
INVENTOR.
Charles S. McCann.
BY
Harness, Dickey & Pierce
ATTORNEYS.

Sept. 23, 1947.        C. S. McCANN        2,427,733
OIL FILTER
Filed Nov. 21, 1945        3 Sheets-Sheet 3

INVENTOR.
Charles S. McCann.
BY
ATTORNEYS.

Patented Sept. 23, 1947

2,427,733

UNITED STATES PATENT OFFICE 2,427,733

OIL FILTER

Charles S. McCann, Racine, Wis., assignor to Walker Manufacturing Company of Wisconsin, Racine, Wis., a corporation of Wisconsin Application November 21, 1945, Serial No. 630,000

3 Claims. (Cl. 210—183)

The present invention relates to filters, and in its herein illustrated embodiments, is particularly directed to the provision of improved oil filters for use in connection with, for example, the force fed lubricating oil systems of automobile engines.

Basically, the present invention involves the use, as a primary filtering medium, of cellulose pulp, sulphite pulp being preferred. The pulp, comprising a cottony mass of very small, individually fuzzy, mechanically entwined or interlocked, particles or fibers, is substantially less subject to channeling difficulties than are conventional fibrous filter materials. In accordance with the invention, however, a secondary filtering medium of cellulosic tissue paper is provided which further reduces any tendency of the oil to form channels through the body of the primary filtering medium. More particularly, the primary filtering medium is laminar, the oil flow being through the successive laminations, and the successive laminations are separated by one or more layers of the paper, which has seepage characteristics as distinguished from finite openings, to give it the property of diffusing or spreading oil streams which encounter it, so that the oil that passes therethrough encounters the next layer of primary filtering medium in well distributed unchanneled form.

Accordingly, principal objects of the invention are to provide improved filtering devices which may be economically manufactured and assembled, and which are reliable and efficient in operation; and, more specifically, to provide such devices wherein the primary filtering medium is a laminar body of cellulose pulp, the successive laminations being separated by one or more layers of sheet-like cellulosic tissue paper material having flow distributing properties.

With the above as well as other and, in certain cases, more detailed, objects in view, which appear in the following description and in the appended claims preferred but illustrative embodiments of the invention are shown in the accompanying drawings, throughout the several views of which corresponding reference characters are used to designate corresponding parts, and in which:

Figure 4 is a view in vertical central section of a modified replaceable cartridge embodying the invention;

Figure 5 is a view in central longitudinal section of a filter unit of the so-called sealed type embodying the invention; and, Figure 6 is a view in central vertical section of a modified sealed unit, embodying the invention.

Figure 1:
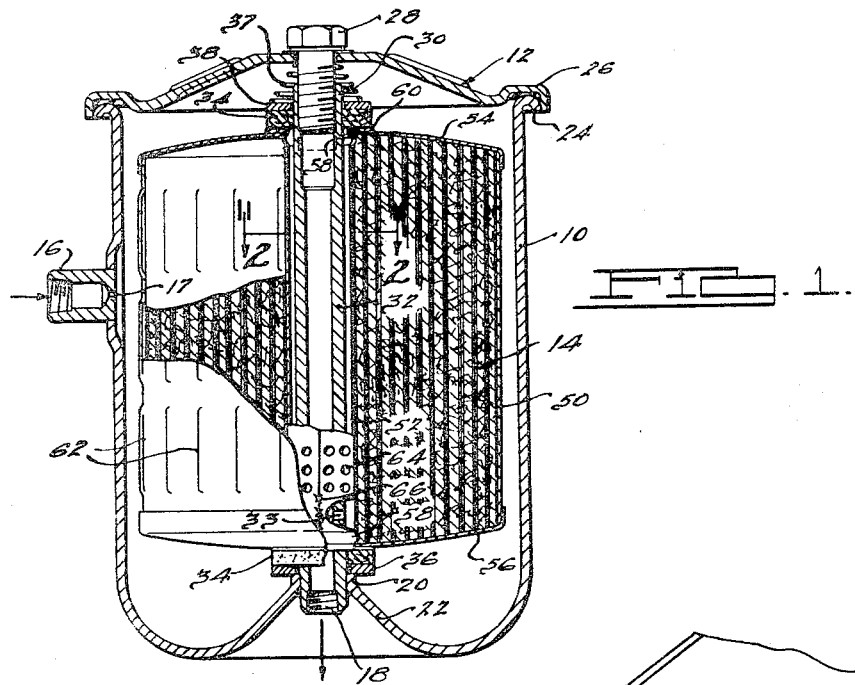
Figure 1 is a view in vertical central section, through a filter unit embodying the invention, said unit being of the replaceable cartridge type.
Figure 2:
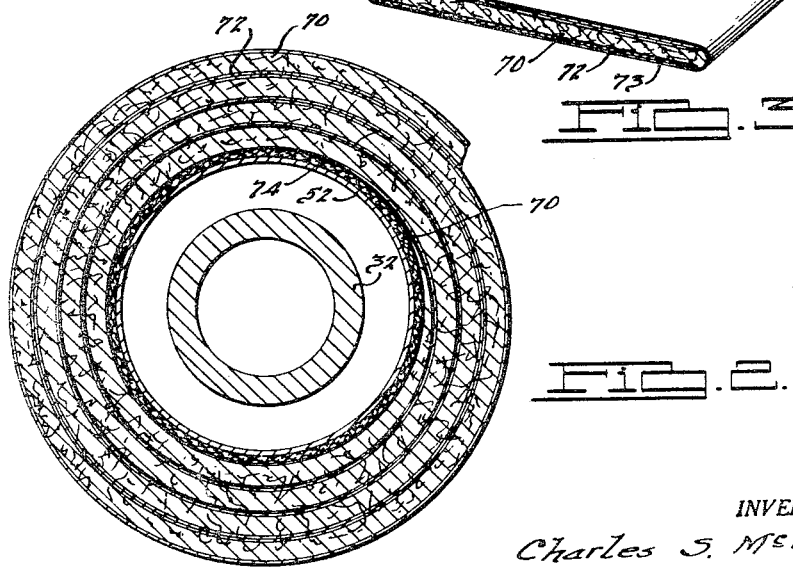
Figure 2 is an enlarged view in horizontal section, taken along the line 2—2 of Figure 1.

Referring first to the embodiment of Figures 1 and 2, the illustrated filter unit, which is arranged for so-called outside to center flow, comprises an enclosing shell 10, which is provided with a removable cover 12, and which receives the replaceable filter cartridge which is designated as a whole as 14. The casing 10 is provided with an inlet connection 16 which incorporates a flow controlling orifice 17, and an outlet connection 18, it being understood that in accordance with usual practice the unit is interposed in a branch of the main oil line, so that only a portion of the lubricating oil stream delivered from the oil pump is passed through the filter. The outlet 18 is sealed, as by welding, within the neck portion 20 of an inwardly directed boss 22 which gives the base of the shell 10 a more or less streamlined shape, thus facilitating cleaning and similar operations.

The upper marginal edge of the shell 10 is outwardly flanged as indicated at 24, and this flanged portion is received in a correspondingly channeled rim portion 26 of the cover 12. The cover is retained in place on the shell 10 by a cap screw 28, which is threaded into the upper end 30 of central tube 32, which is integral with the outlet connection 18, and extends vertically upwardly through the shell 10, concentric with the axis thereof. As will be evident, the tube 32 passes through the body of the filter cartridge 14, and is provided with two or more circumferentially distributed apertures 33, which afford communication, through cartridge 14, between the inlet 16 and the outlet 18. The apertures 33 are preferably located near the lower end of the tube 32 to facilitate drainage.

The cartridge 14 is retained in place, in properly centered relation to tubes 32, between cork or equivalent gaskets 34. The lower gasket 34 is seated on a washer 36, which rests freely upon the upper end of the neck 20. A coil spring 37 is interposed between the cover 12 and the cartridge and acts to yieldingly hold the cartridge in place. More particularly, the lower end of the spring acts through a washer 38, the upper gasket 34, to apply pressure to the upper end of the cartridge, and force the lower end of the cartridge into sealing engagement with the lower gasket 34.

It is noted that the upper end of the spring 37 frictionally grips the cap screw 28, so that when the latter is turned to remove the cover, the spring releasably retains the cover and the cap screw in assembled relation to each other.

The filter cartridge 14 comprises primarily the hereinafter described laminar filter body, which is received in a shell defined by an outer enclosing wall 50, a central tube or core 52, upon which the main filter material is wound, and enclosing ends 54 and 56. Elements 50, 52, 54, and 56 may, of course, be formed from relatively light sheet metal, by usual rolling and stamping operations. Preferably and as illustrated, the central tube 52 is provided adjacent its ends with radially projecting bosses 58, which act as seats for the end covers 54 and 56. In the preferred assembly practice, the body is wound upon the tube 52, the shell 50 is passed thereof and centralized longitudinally, and finally, the ends 54 and 56 are simultaneously applied, so as to equalize the lengthwise compression of the filter body. After such end covers are applied to the central tube 52, the extreme end portions 60 of the latter are spun over, thereby securing the end covers and the tube in assembled relation to each other.

In the present embodiment, the shell 50 affords the initial or rough stage of filtration, and for this purpose, the perforations in the wall thereof through which the oil is admitted to the interior of the cartridge, are constituted by a plurality of louvers 62, which are formed integrally, by a usual combined piercing and forming operation. The individual louvers 62 are elongated in form, and present relatively narrow openings. The width of each louver opening is proportioned to be less than the expected size of the larger abrasive particles in the oil stream. By virtue of the length of each louver opening, the area thereof is relatively large, and, consequently, sufficient louver area may readily be provided so that the combined areas of the louver openings are many times larger than the respective cross sectional areas of the inlet and outlet 16 and 18.

The central tube 52 is provided throughout the intermediate portion of its length, with a plurality of openings 64, which afford access from the interior of the cartridge to the annular space between the cartridge and the central tube or post 32. It will be appreciated that, if desired, openings 64 may be of louvered form and that also the combined areas of these openings are preferably as large as or in excess of the cross sectional areas of the inlet and outlet 16 and 18. It will be noted that the perforate portion of the tube 52 terminates a substantial distance away from the respective end covers 54 and 56. If, as illustrated, tube 52 is formed from a rolled sheet of material, and is completed by welding along the joint 66, such joint is preferably made tight in the otherwise imperforate portions of the tube. With this relation, the oil which passes through the filter body is required to enter the tube 52 in a restricted area intermediate the ends of the latter, thus preventing the oil from flowing around the ends of the filter body and thereby bypassing the body material. In service the oil pressure acting on the filter body compacts it somewhat both radially and axially. The spaces between the ends of the body and the end covers become filled with separated solid matter. The imperforate end portions of the tube 52 each exceed in length the total amount of such axial compacting.

Referring particularly to the laminar filter body, it is, in the illustrated form, made up of a spirally wound strip 70 of the previously identified cellulose pulp. Initially, the strip is wrapped in a single overlapped layer 72 of tissue or crepe paper, impregnated with a suitable resin to give it the characteristic known commercially as "wet strength." As shown, the paper 72 is wrapped transversely of the length of the strip, thereby covering the side edges of the latter, which lie adjacent the upper and lower ends of the cartridge 14. Generally speaking, it is preferred to close the ends of the strip material.

The unimpregnated cellulose pulp is conventionally formed by a process which includes wetting and rolling steps, which steps, in view of the naturally fuzzy character of the minute pulp particles, causes them to mechanically entwine or interlock with each other, in a random distribution, which entwining or interlocking affords a natural binder. The thus formed strip is, however, capable of being substantially compressed, and in winding it upon the core (constituted primarily by the tube 52), it is wound relatively tightly, so as to increase the amount of filter incorporated in a cartridge of a given size and to increase the density of the filter body. By way of example, the winding may be sufficiently tight to reduce the thickness of the strip to between 50% and 20% of its free thickness. As a corresponding example, the pulp 70 may have a thickness of $\tfrac{1}{16}''$ per ply.

It will be noticed that the winding operation naturally produces the above described laminar form, leaving four plies of paper between each lamination of pulp 70. Three of the above may be the wet strength paper, and the remaining ply 73 is an unimpregnated layer of paper, which is provided to facilitate the handling of the pulp, during manufacture. As previously pointed out, the mechanical interlocking between particles gives the pulp a pronounced resistance to channeling. The layers of paper 72, however, which lie between successive laminations of the pulp, markedly improve the non-channeling characteristics of the filter body, since the paper tends to distribute the flow of oil. Also, the paper laminations have filtering characteristics, and so supplement the filtering action of the pulp.

In the preferred practice of the invention, a final stage of filtration is afforded by one or more layers 74 of ordinary fine textured, unimpregnated, muslin. In the illustrated instance, utilizing an outside to center flow, the muslin is wound directly upon the central tube or core 52, after which the primary filter body comprising elements 70 and 72 is wound over the muslin 74.

In the illustrated replaceable cartridge type, the strip 70—72 is wound up to a size which gives it a radially compressed fit within the cartridge shell 50. The initial width of the strip is preferably such that some compression thereof is effected when the end covers 54—56 are secured in place, thereby reducing the amount of axial compacting which takes place in service, and which is discussed above.

The action of the above described filter appears to be obvious from the foregoing description, but, by way of summary, it is noted that oil admitted through the inlet 16 is enabled to completely fill the interior of the jacket 10—12. Such oil enters the cartridge 14 through the louvers 62 which, as is previously pointed out, afford a first filtering stage, by separating out the larger abrasive particles. The thus partially filtered oil passes radially through the filter body 70—72—74, and through the openings 64 in the tube 52 into the annular space between tube 52 and post 32. From this annular space, the oil flows through the openings 33, through the tube 32, and discharges through the outlet 18. The filter body 70—72 serves to separate substantially all abrasive particles and sludge and all entrained water. Any abrasive particles and sludge which pass through the just-mentioned filter body are blocked by the muslin 74.

Figure 3:
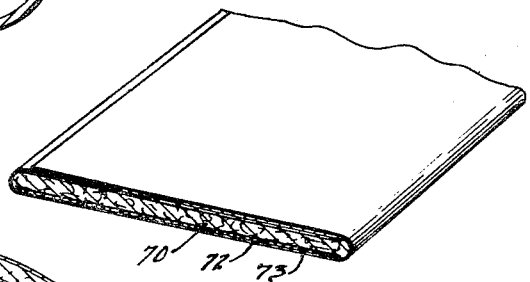
Figure 3 is a fragmentary view of a sheet of the sulphite pulp with its enclosing wrapping of wet strength paper.

The modified embodiment of the invention shown in Figure 4 employs, instead of the tube 52, and the muslin layer 74, a core 80 which has filtering properties as well as mechanical properties which enable it to function as a core upon which the filter body is wound. In accordance with the invention, the tube 80 may be formed from a resin impregnated molding powder, from resin impregnated sheet-like material, ceramic material, powdered metal, or the like. In this instance, accordingly, the tube 80 functions as the final stage of filtration. In this instance, further, the end closures 82 and 84 are secured to the shell 50 by means of conventional rolled seams 86. In all other respects the embodiment of Figure 4 may duplicate the embodiment of Figures 1, 2, and 3, and may be similarly associated with an enclosing jacket or casing 10—12.

The embodiment of Figure 5 is of the so-called sealed type, and comprises a cartridge 90, which is received in an enclosing casing comprising portions 92 and 94, which are connected to each other by a rolled seam 96.

As in the first embodiment, the cartridge 90 is of laminar form, comprising the spirally wound elements 70—72, the wrapped muslin 74, and the apertured central tube 52'. In this instance, the wrapped strip 70—72 is secured in place by tying with one or more turns 98 of cord, or its equivalent.

The cartridge 90 is supported within the casing, by means of end covers 100 and 102. The lower cover 102 is provided with a dished central portion 104 which snugly fits within the central tube 52', and the marginal edges of the cover 102 bear against the wall of the casing member 92. The upper cover 100 is provided with a dished central portion 106, which correspondingly fits within the upper end of the tube 52. The central portion of the dished section 106 is upwardly directed, to define the conical surface 108, and a short substantially cylindrical neck portion 110, which snugly fits within the bore of the outlet fitting 112. The end of the neck 110 is apertured, as indicated at 111. The marginal edge of the cover 100 bears against the wall of the casing portion 94, and the proportioning of the parts is such that when the casing portions 92 and 94 are fitted together, the spring-like covers 100 and 102 assume the illustrated dished form, thereby firmly securing the cartridge in place. The resultant pressure of the cover 100 against the fitting 112 causes the lower end of the latter to bear against the conical surface 108, thereby forming a tight seal.

As shown, the structure is provided with two inlet fittings 114 and 116, either of which may be utilized, in accordance with conventional practice. Oil entering either of the inlets 114 and 116 passes through the marginal apertures 118 in the covers 100 and 102, into the annular space 120 which surrounds the cartridge. From this point, the oil passes through the filter, and discharges through the outlet 112, in the previously described manner.

Figure 6:
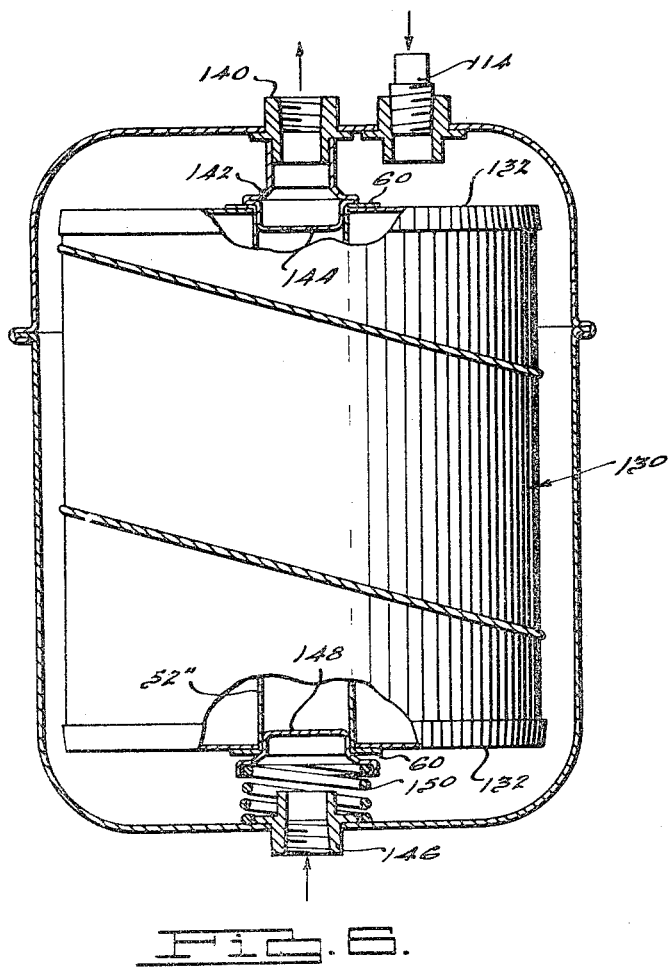

The embodiment of the invention shown in Figure 6 is also of the sealed type, and differs from the embodiment of Figure 5 principally in respect to the manner in which the cartridge is supported within the casing. In this instance, the cartridge 130 is provided with a central tube or core 52'', and end plates 132. As in the first embodiment, the end plates are secured in place on the tube 52' by spinning over the extreme end portions 60 of the latter. The filter body may be constructed as described with reference to Figure 5, and as will be appreciated, this filter body is compressed between the covers 132.

In the instance now being described, the outlet fitting 140 has associated therewith a fitting 142, which defines an apertured end portion 144 which is snugly received within the bore of the tube 52''. Similarly, the lower inlet fitting 146 has associated therewith a fitting 148, the imperforate base of which is snugly received within the lower end of the tube 52'. A compression spring 150, seated between the fitting 148 and the base of the casing, yieldably urges the cartridge assembly upwardly and holds the cartridge and the fittings 142 and 148 in assembled relation to each other. The operation of this embodiment is as described with reference to Figure 5.

Although only several specific embodiments of the invention have been described in detail, it will be appreciated that various further modifications in the form, number, and arrangement of the parts may be made without departing from the spirit and scope of the invention.

What is claimed is:

1. A filter unit for liquids comprising a laminar body adapted for association with casing means having liquid inlet and outlet means, in such relation that liquid admitted through the inlet means reaches the outlet means only by flowing through the laminations in a direction transverse to the surfaces of adjacent laminations, said laminar body comprising alternately arranged laminations of primary and secondary filtering material and embodying means to compact said laminations in said transverse direction so that the surfaces of successive laminations are in firm, substantially continuous engagement with each other, there being a plurality of said primary laminations and each thereof comprising a substantially homogeneous cottony layer of substantially uniformly distributed and randomly arranged fibrous particles of cellulose pulp having the property of entrapping foreign particles entrained in said liquid, said compacted pulp serving to resist channeling, there being between successive ones of said primary laminations a said secondary lamination composed of a sheet of cellulosic tissue paper of at least one layer and being of a thickness which is only a minor fraction of the thickness of a single said primary lamination, said tissue paper being permeable to the liquid being filtered but characterized by seepage characteristics as distinguished from finite openings, whereby said tissue paper diffuses or spreads liquid flow therethrough and so cooperates with said compacted primary laminations is preventing a channeled flow through the body.

2. A filter unit for liquids comprising a laminar spirally wound body adapted for association with casing means having liquid inlet and outlet means, in such relation that liquid admitted through the inlet means reaches the outlet means only by flowing through the spirally wound body in directions which are transverse to the surfaces of adjacent laminations, said laminar body comprising a single continuous laminar strip of filtering material tightly wound in spiral form so that the body is radially compacted whereby the surfaces of adjacent turns are in firm substantially continuous engagement with each other, said laminar strip comprising a primary lamination and at least one secondary lamination and there being sufficient turns so that liquid flowing radially thereof passes successively through a plurality of primary laminations and a plurality of secondary laminations, said primary lamination consisting of a substantially homogeneous cottony layer of substantially uniformly distributed and randomly arranged fibrous particles of cellulose pulp having the property of entrapping foreign particles entrained in said liquid, and being resistant to channeling, said secondary lamination being a sheet of cellulosic tissue paper composed of at least one layer and being of a thickness which is only a minor fraction of the thickness of said primary lamination, said tissue paper being permeable to the liquid being filtered but characterized by seepage characteristics as distinguished from finite openings, whereby said tissue paper distributes flow of liquid through the filter body and cooperates with said primary lamination in preventing channeling of the liquid through said layers of fibrous particles.

3. A filter unit for liquids comprising a cylindrical container having a cylindrical outer wall, a central tubular member and ends enclosing the annular space between the outer wall and the tubular member, the tubular member and said outer wall being perforate, and said container being adapted for association with casing means in such relation that the liquid to be filtered is caused to pass through said perforations and through the said annular space in generally radial directions, said unit further comprising a laminar filter body disposed in said annular space in radially and axially compacted relation, said laminar body comprising a single continuous laminar strip of filtering material tightly wound in spiral form so that the body is radially compacted whereby the surfaces of adjacent turns are in firm substantially continuous engagement with each other, said laminar strip comprising a primary lamination and at least one secondary lamination and there being sufficient turns so that liquid flowing radially thereof passes successively through a plurality of primary laminations and a plurality of secondary laminations, said primary lamination consisting of a substantially homogeneous cottony layer of substantially uniformly distributed and randomly arranged fibrous particles of cellulose pulp having the property of entrapping foreign particles entrained in said liquid, said compacted primary laminations being resistant to channeling, said secondary lamination being a sheet of cellulosic tissue paper composed of at least one layer and being of a thickness which is only a minor fraction of the thickness of said primary lamination, said tissue paper being permeable to the liquid being filtered but characterized by seepage characteristics as distinguished from finite openings, whereby said tissue paper distributes flow of liquid through the filter body and cooperates with said primary lamination in preventing channeling of the liquid through said layers of fibrous particles.

CHARLES S. McCANN.

REFERENCES CITED

The following references are of record in the file of this patent:

UNITED STATES PATENTS

| Number | Name | Date |
|---|---|---|
| 1,940,316 | McKinley | Dec. 19, 1933 |
| 2,173,978 | Pennebaker | Sept. 26, 1939 |
| 2,369,857 | Russell et al. | Feb. 20, 1945 |
| 2,197,252 | Decker | Apr. 16, 1940 |
| 2,092,548 | Briggs | Sept. 7, 1937 |
| 2,098,102 | McLean | Nov. 2, 1937 |
| 2,386,684 | Hermanson | Oct. 9, 1945 |
| 2,101,811 | Franzmeier | Dec. 7, 1937 |
| 853,981 | Kneuper | May 21, 1907 |
| 2,278,603 | Williams | Apr. 7, 1942 |
| 2,196,821 | Arnold | Apr. 9, 1940 |
| 754,053 | Derham | Mar. 8, 1904 |
| 2,325,399 | Houston | July 27, 1943 |
| 2,209,180 | Von Pentz | July 23, 1940 |